April 5, 1927.

E. W. KNOWLTON 1,623,795

ATTACHMENT FOR MEAT CUTTING MACHINES

Filed Jan. 29, 1925     2 Sheets-Sheet 1

Inventor;
Eugene W. Knowlton,
by Geyer & Geyer
Attorneys.

April 5, 1927.

E. W. KNOWLTON

ATTACHMENT FOR MEAT CUTTING MACHINES

Filed Jan. 29, 1925    2 Sheets-Sheet 2

Inventor,
Eugene W. Knowlton,
by Geyer & Geyer
Attorneys.

Patented Apr. 5, 1927.

1,623,795

UNITED STATES PATENT OFFICE.

EUGENE W. KNOWLTON, OF BUFFALO, NEW YORK, ASSIGNOR TO JOHN E. SMITH'S SONS CO., OF BUFFALO, NEW YORK, A CORPORATION OF NEW YORK.

ATTACHMENT FOR MEAT-CUTTING MACHINES.

Application filed January 29, 1925. Serial No. 5,493.

This invention relates to improvements in meat cutting machines of the type shown in United States Letters Patent, No. 1,490,747 and issued April 15th, 1924.

The principal object of the invention is to provide novel means for scraping the bowl and fully discharging any portion of its contents still remaining after dumping the bowl.

Another object of the invention is to provide an attachment of this character which is simple, compact and inexpensive in construction, and which can be readily applied to machines now on the market without in any way altering their construction.

Figure 1:
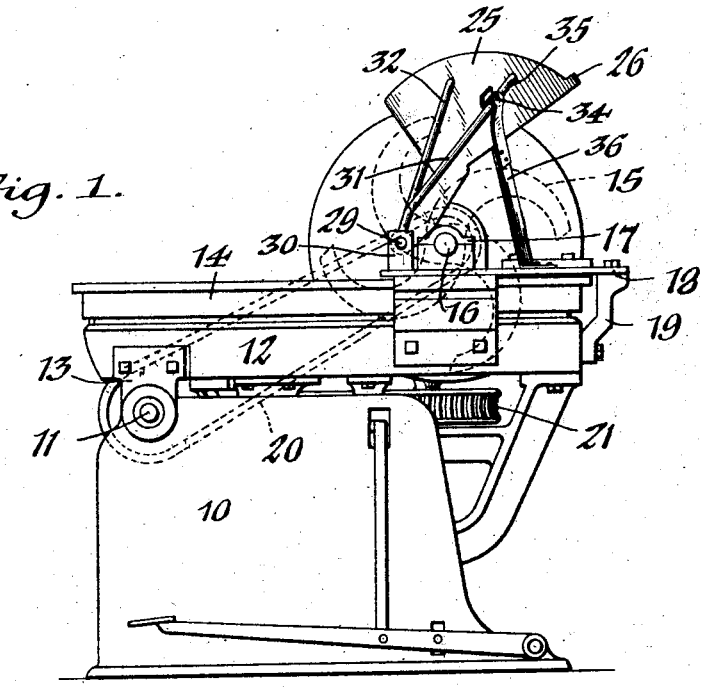
Figure 2:
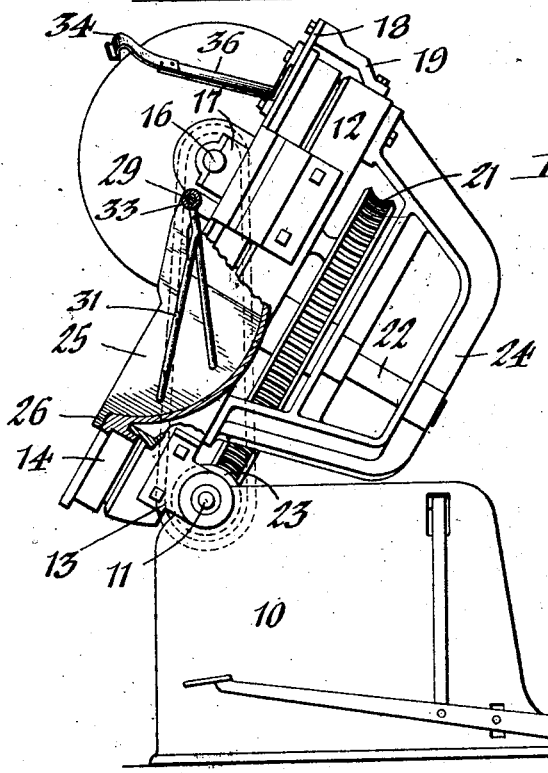
Figure 3:
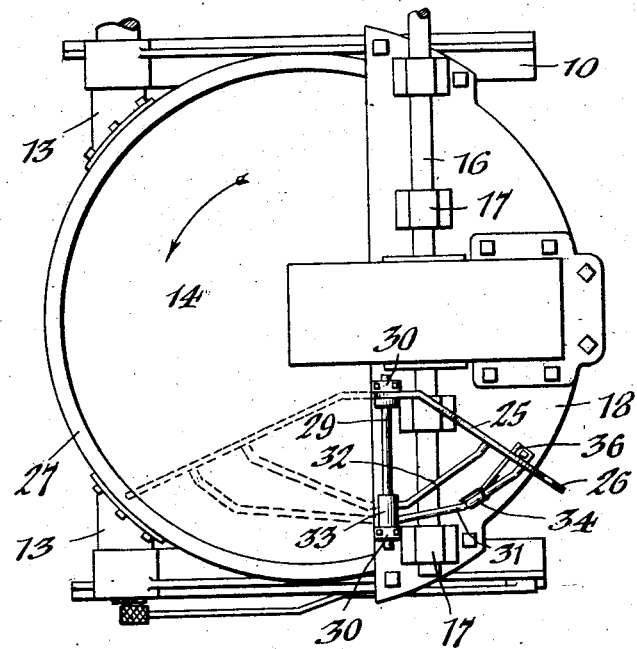
Figure 4:
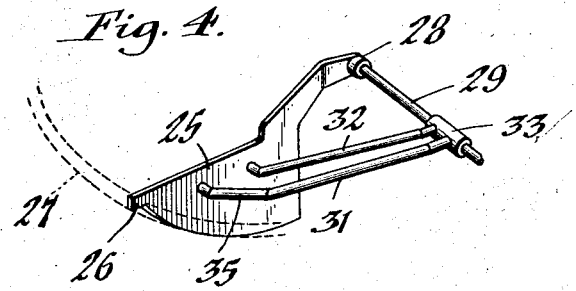

In the accompanying drawings.—Figure 1 is a side elevation of a meat cutting machine equipped with the improvement. Figure 2 is a similar view, partly in section, showing the meat bowl in its tilted or dumping position and the scraping and deflecting device in its operative position. Figure 3 is a top plan view of the machine. Figure 4 is a detached perspective view of the scraping and deflecting device.

Similar characters of reference indicate corresponding parts throughout the several views.

The meat cutting machine shown in the drawings, consists of a suitable supporting frame 10 having a horizontal driving shaft 11 journaled thereon at its front end, a tiltable support or bed-ring 12 having hinge brackets 13 loosely mounted on said driving shaft to rock relatively thereto, and a meat bowl 14 of the usual concavo-convex form rotatably arranged within the bed-ring. The customary rotary cutter 15 is mounted on a transverse shaft 16 journaled in bearings 17 carried by a cover-plate 18 arranged over the rear portion of the bowl and supported by brackets 19 secured to the bed-ring. As shown in the drawings, the cutter shaft may be driven from the driving shaft 11 by a sprocket-chain 20.

Any suitable means may be employed for rotating the bowl 14, that shown in Figs. 1 and 2 consisting of a worm wheel 21 mounted on a vertical shaft 22 depending from the bowl and attached to the underside thereof by appropriate fastenings, the same meshing with a worm 23 mounted on the driving shaft 11 of the machine. The lower end of the worm-wheel shaft is journaled in a skeleton-like frame 24 secured to the underside of the bed-ring 12.

The tilting mechanism for effecting the raising of the bed-ring and the bowl from the position shown in Fig. 1 to the dumping position shown in Fig. 2 is fully disclosed in the aforesaid Patent, No. 1,490,747. As it forms no part of my present invention, it has not been deemed necessary to show and describe the same herein.

In cutting sausage meat, the same has a tendency to adhere to the walls of the bowl 14. For this reason, a combined scraping and deflecting device, which constitutes the subject matter of this invention, has been designed for effecting the complete removal of the meat still remaining in the bowl after the same has been elevated to the dumping position shown in Fig. 2. This device preferably consists of a vertically-swinging blade 25 adapted to extend transversely of the bottom and side walls of the trough-shaped bowl. As shown in Figs. 1, 2 and 4, the bottom edge of the blade conforms to the curvature of the bowl and its front or outer end terminates in a stop lug or shoulder 26 adapted to rest on the flange 27 of said bowl in its operative position. The blade is disposed at one side of the center of the bowl and is provide at its rear or inner end with a hub 28 fixed near one end of a horizontal rock-shaft 29 journaled at its ends in suitable bearings 30 fastened to the cover-plate 18, the body of the blade being arranged at an angle to its hub so as to direct or deflect the contents of the bowl outwardly and over the edge thereof. Braces or stay-rods 31, 32 connect the rear side of the blade-body 25 with a collar 33 fixed on the other end of the rock-shaft 29.

In order to hold the scraper blade in its retracted or inoperative position, shown in Figs. 1 and 3, a retaining device is provided which is preferably in the form of a flexible hook 34 for receiving the offset portion 35 of the brace 31. This hook may be attached to the upper end of a suitable bracket 36 secured to the cover-plate 18.

In the operation of this attachment, assume the bowl to be in its tilted position and as much of the contents emptied as could be done by dumping. The blade 25 is now lowered to the position shown in Fig. 2 and motion is imparted to the bowl. The rotation of the bowl relative to the blade causes the meat still remaining in the bowl to be scraped clean from the walls thereof and to be at the same time deflected outwardly into the receptacle provided for receiving it.

While manifestly simple in construction and easy to manipulate, this improvement permits the removal of the bowl-contents in a sanitary manner without the hands touching it.

I claim as my invention:—

1. In a meat cutting machine, the combination of a rotary bowl, a support for the bowl tiltable from a horizontal to a substantially upright position to dump the bowl-contents, a scraper movable into and out of the bowl, and means for driving the bowl in its tilted position.

2. In a meat cutting machine, the combination of a rotary bowl, a support for the bowl tiltable from a horizontal to a substantially upright position to dump the bowl-contents, driving mechanism connected with the bowl both in its normal and dumping positions, and a combined scraper and discharge deflector fulcrumed on said support to move into and out of the bowl.

3. In a meat cutting machine, the combination of a rotary bowl, a tiltable support for said bowl, a vertically-swinging scraping device mounted on said support for movement into and out of said bowl, means for rotating the bowl while in its tilted position and means for holding said scraping device in its retracted position, said scraping device being operative only in the tilted position of the bowl to deflect its contents outwardly over the edge thereof.

4. In a meat cutting machine, the combination of a rotary bowl, a tiltable support for said bowl, a rock shaft journaled on said support, a vertically-swinging scraper blade mounted on one end of said shaft, and a brace connecting said scraper blade with the other end of said shaft.

5. In a meat cutting machine, the combination of a rotary bowl, a tiltable support for said bowl, a rock shaft journaled on said support and having a collar fixed to one end thereof, a vertically-swinging scraper blade having a hub fixed to the other end of said shaft, a brace connecting said scraper blade with the shaft-collar, a retaining hook mounted on said tiltable support and arranged to receive said brace for holding the scraper in its inoperative position and driving mechanism for rotating the bowl while in its tilted position.

EUGENE W. KNOWLTON.